United States Patent [19]
Tripathy

[11] Patent Number: 6,149,158
[45] Date of Patent: *Nov. 21, 2000

[54] UNITIZED OIL SEAL WITH PTFE SEALING DISK SPLIT AT RADIALLY OUTER EDGE AND METHOD OF MANUFACTURE

[75] Inventor: Bhawani S. Tripathy, Ann Arbor, Mich.

[73] Assignee: Federal-Mogul World Wide, Inc., Southfield, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 09/107,117

[22] Filed: Jun. 30, 1998

[51] Int. Cl.[7] .............................. F16J 15/34; F16J 15/32
[52] U.S. Cl. .......................... 277/307; 277/309; 277/352; 277/353; 277/402; 277/551; 277/570
[58] Field of Search ..................................... 277/353, 394, 277/402, 500, 549, 560, 562, 564, 566, 571, 551, 570, 307, 309, 352

[56] References Cited

U.S. PATENT DOCUMENTS

| | | | |
|---|---|---|---|
| 4,484,752 | 11/1984 | Bentley | 277/377 |
| 4,596,394 | 6/1986 | Schmitt | 277/353 |
| 4,759,553 | 7/1988 | Goodman et al. | 277/394 X |
| 4,943,068 | 7/1990 | Hatch et al. | 277/353 X |
| 4,995,621 | 2/1991 | Devouassoux | 277/402 X |
| 5,013,052 | 5/1991 | Butler et al. | 277/402 |
| 5,201,528 | 4/1993 | Upper | 277/394 |
| 5,209,499 | 5/1993 | Ruff, Jr. et al. | 277/562 X |
| 5,209,502 | 5/1993 | Savoia | 277/562 |
| 5,462,287 | 10/1995 | Hering et al. | 277/559 |
| 5,615,894 | 4/1997 | vom Schemm | 277/559 |
| 5,653,448 | 8/1997 | Schlosser | 277/349 |
| 5,957,461 | 9/1999 | Ulrich | 277/549 X |
| 6,079,715 | 6/2000 | Johnen et al. | 277/562 X |

FOREIGN PATENT DOCUMENTS 34 02 366 A1  8/1985  Germany.
36 01 349 A1  7/1987  Germany.

*Primary Examiner*—Anthony Knight
*Assistant Examiner*—Robert L. Pilaud
*Attorney, Agent, or Firm*—Reising, Ethington, Barnes, Kisselle, Learman & McCulloch, P.C.

[57] ABSTRACT

A unitized oil seal assembly (20, 220, 320, 420) has a sealing disk (34, 234, 334, 434) fabricated of a single water of PTFE-based material that is split along its radially outer edge to define a pair of split sections, one of which (48, 248, 348, 438) is fixed to an outer annular carrier member (30, 230, 330, 430) and supports the other split section (50, 250, 350, 450) and an unsplit section (52, 252, 352, 452) in sealing engagement with corresponding sealing surfaces of a wear sleeve (32, 232, 332, 432) to exclude contaminants and retaining lubricant, respectively, from passing by the seal assembly (20, 220, 320, 420).

14 Claims, 3 Drawing Sheets

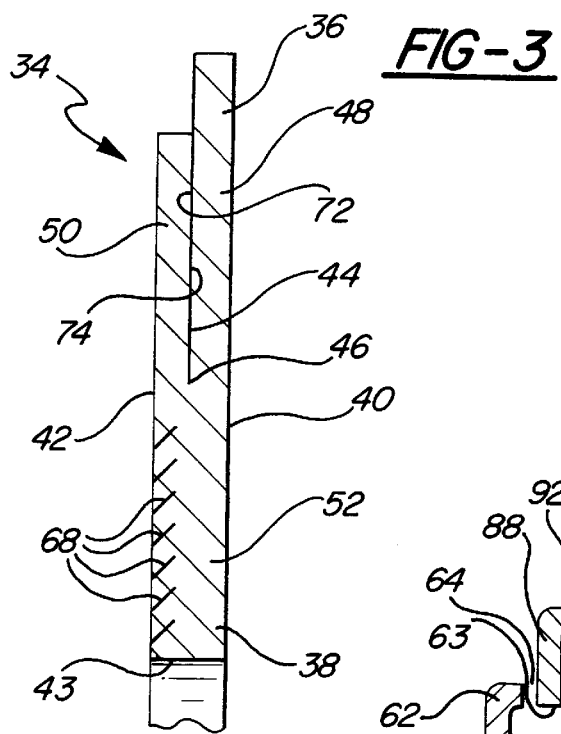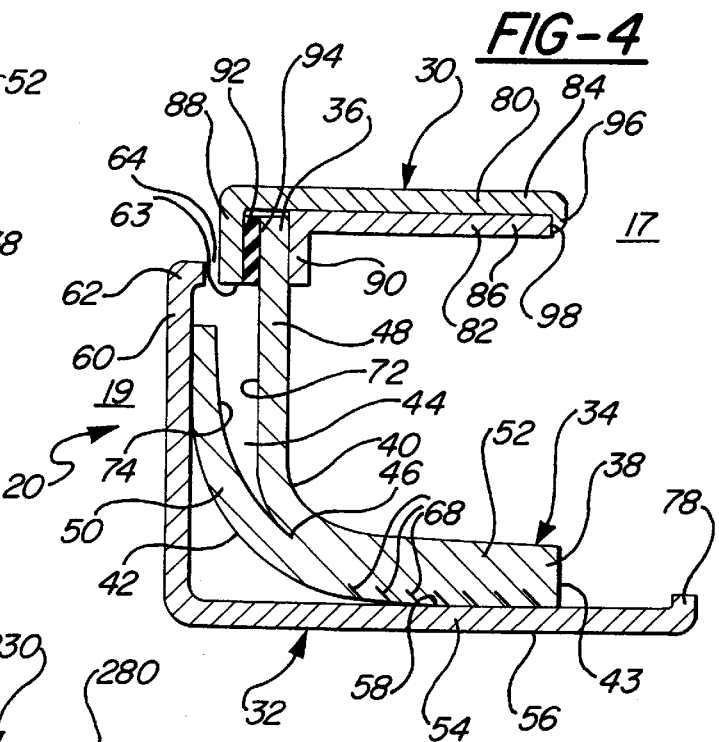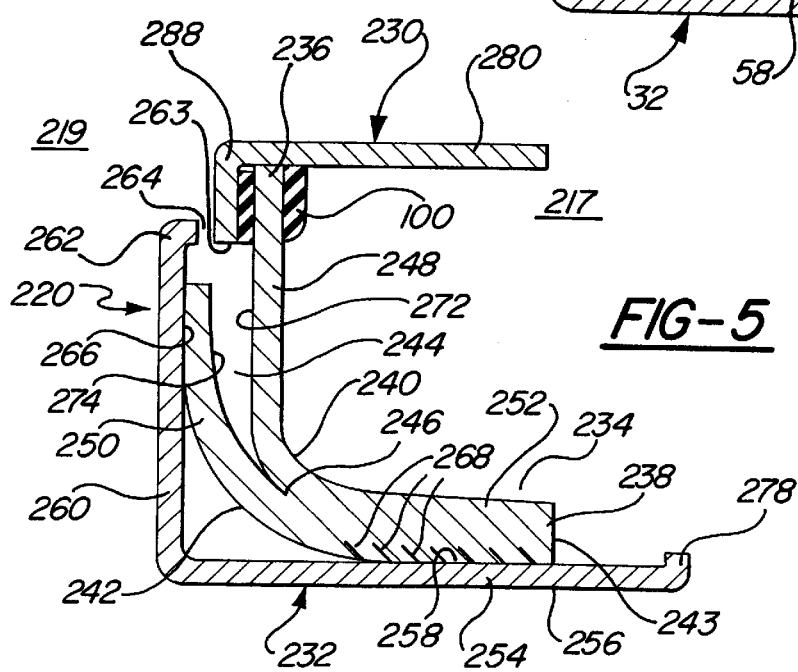

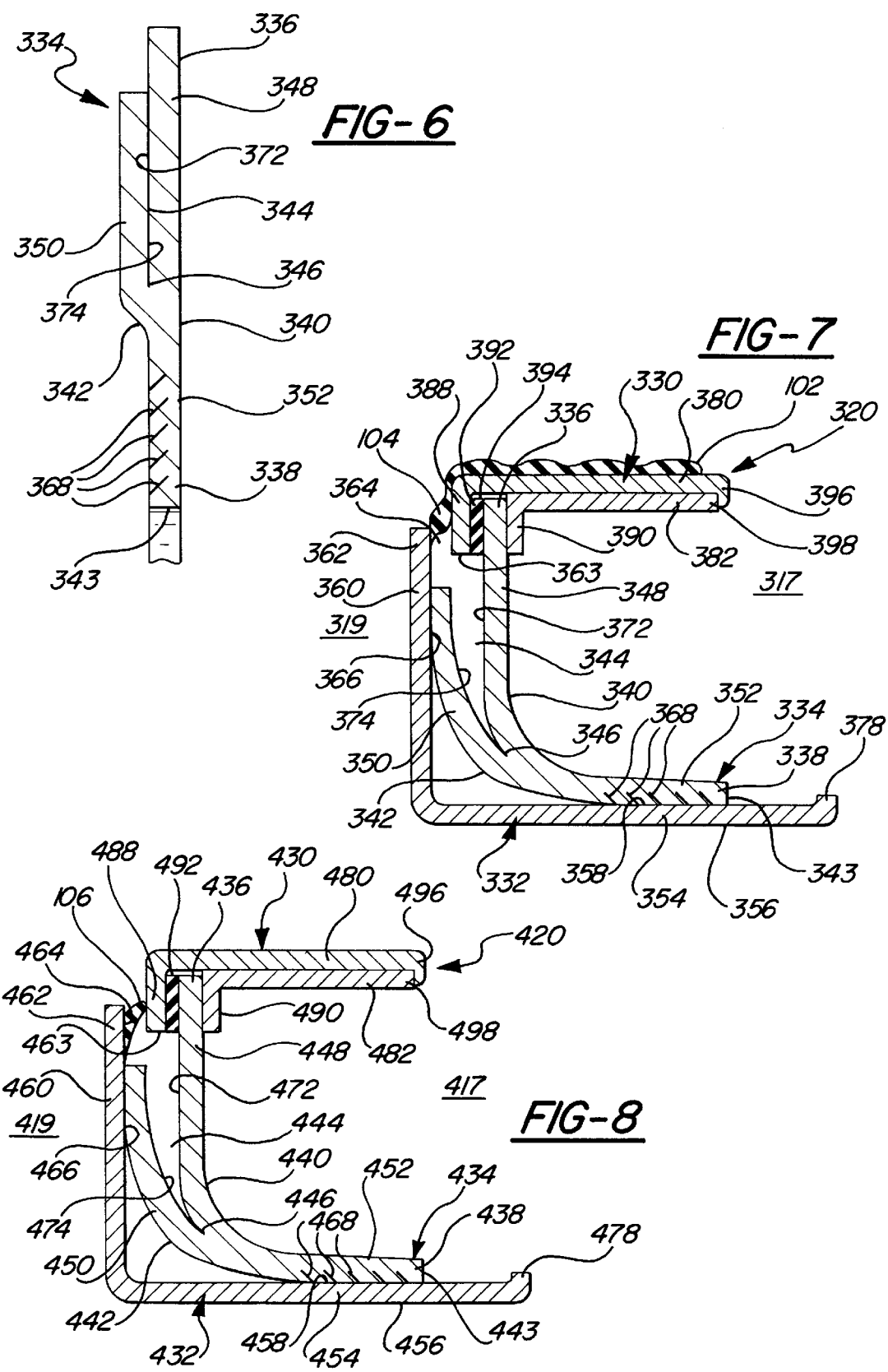

UNITIZED OIL SEAL WITH PTFE SEALING DISK SPLIT AT RADIALLY OUTER EDGE AND METHOD OF MANUFACTURE

BACKGROUND OF THE INVENTION

1. Technical Field

This invention relates generally to oil seals of the type having a carrier, a wear sleeve, and a sealing disk unitized in a single assembly, and more particularly to such seals wherein the sealing disk component has a pair of annular sealing lips that engage the wear sleeve in such manner that one of the lips retains lubricant on one side of the seal and the other lip excludes contaminants on the other side of the seal.

2. Related Prior Art

Unitized oil seals are commonly used in various mechanical devices wherever one component rotates in a bearing relative to an adjacent stationary component. The seal operates to close an annular space between the components in order to retain lubricant on the bearing side of the seal and exclude contaminants on the exterior side of the seal, to protect the bearing.

U.S. Pat. No. 4,484,752, which is owned by the assignee of the present invention and its disclosure incorporated herein by reference, discloses a unitized oil seal assembly having a pair of discrete sealing disks fixed side-by-side on the carrier to provide a pair of annular sealing lips that sealingly engage the wear sleeve. One lip serves as the oil-retaining seal and the other lip serves as the contaminant-excluding seal. While such oil seal assemblies perform satisfactorily, the requirement for two sealing disk elements adds cost and complexity to the manufacture of such assemblies. When fully assembled with the wear sleeve, the lips of the disks are bent in opposite axial directions. Special care must be taken to support the lips during assembly to assure that the lips maintain their oppositely bent orientation, further complicating the manufacture of such seal assemblies.

U.S. Pat. No. 5,462,287 discloses an oil seal having a single disk element whose inner free edge is split into two relatively thinner annular lip sections that serve as the oil-retaining and contaminant-excluding lips of the seal assembly. Splitting the inner free edge of the disk necessarily decreases the effective thickness of the oil-retaining lip, which may not be desirable in some applications where the oil-retaining lip is subject to wear. Additionally, the disclosed seal assembly utilizes the split side of the oil-retaining lip as the working surface in contact with the wear sleeve, making it more difficult to provide the usual hydrodynamic grooves or formations on the working surface of the oil-retaining lip. Special care must be taken to assure that the lip sections are bent in opposite axial directions, which adds cost and complexity to the assembly process and makes the root of the split prone to possible tensile forces and premature wear or tearing.

U.S. Pat. No. 5,615,894 discloses a non-unitized oil seal having a single sealing disk whose inner free edge is split to provide oil-retaining and contaminant-excluding lip portions. Special dies and forming steps are required to emboss hydrodynamic ribs on the contacting surfaces of both lip sections, which adds to the cost and complexity of the manufacture of such seals. The lip sections are also bent in opposite axial directions, and thus this seal assembly shares the same draw backs as those described previously.

Other unitized oil seal assemblies are known to include a PTFE sealing disk element having a conical configuration rather than the usual flat wafer configuration. The conical disk is bonded to the carrier by an annular rubber mounting collar. The collar encircles the disk at a location between its ends and supports the ends in sealing engagement with the wear sleeve to serve as the oil-retaining and contaminant-excluding lips of the seal. Such conical sealing disks are costly in comparison to traditional flat wafers and add to the complexity of making such seals, as does the need for the rubber mounting collar.

SUMMARY OF THE INVENTION AND ADVANTAGES

According to a first aspect of the invention, a unitized oil seal assembly is provided having a rigid annular carrier member, a rigid annular wear sleeve formed with a primary sealing surface and a secondary sealing surface, and an annular sealing disk fabricated of a single piece of polymeric material having radially opposed edges. The assembly is characterized by the sealing disk including an annular circumferentially extending split dividing one edge of the disk into a pair of adjacent first and second split sections joined at the root of the split to an integral unsplit section at the opposite edge of the disk. The first split section is fixed to the carrier member and supports the unsplit section and the second split section in sealing engagement with the primary and secondary sealing surfaces of the wear sleeve.

Mounting the disk by one of its split sections has the advantage of providing a full thickness unsplit section which preferably would serve as the oil-retaining lip of the seal assembly. Such mounting of the disk has the further advantage of enabling the second split section to be automatically positioned in opposite axially extending relation to the split section in response to assembling the wear sleeve with the sealing disk and carrier. Such mounting of the disk eliminates a step in the assembly process of having to orient the oil-retaining and contaminant-excluding sealing lips in opposite directions, thereby simplifying the construction and manufacture of such seal assemblies and reducing the cost involved.

Another advantage of the invention is that the unsplit section and second split section can be supported in such manner that they engage the wear sleeve on a common outer surface of the sealing disk. This enables hydrodynamic formations to be formed according to conventional practice and further supports the root of the split in compression rather than tension, thereby lessening the opportunity for weakening or tearing of the sealing disk.

BRIEF DESCRIPTION OF THE DRAWINGS

These and other advantages and features of the invention will be readily appreciated as the same becomes better understood by reference to the following detailed description when considered in connection with the accompanying drawings, wherein:

FIG. 3 is an enlarged sectional view taken generally along lines 3—3 of FIG. 2;

FIG. 4 is an enlarged sectional view of a seal assembly constructed according to a first embodiment of the invention embodying the sealing element of FIG. 2 and 3;

FIG. 5 is an enlarged sectional view of an alternative embodiment of a seal assembly constructed according to the invention;

FIG. 6 is an enlarged fragmentary sectional view of a sealing element only constructed according to an alternative embodiment of the invention;

FIG. 7 is an enlarged sectional view of a seal assembly constructed according to another embodiment of the invention incorporating the sealing element of FIG. 6; and FIG. 8 is an enlarged sectional view of a further embodiment of a seal assembly constructed according to the invention.

DETAILED DESCRIPTION OF THE PREFERRED EMBODIMENTS

Figure 1:
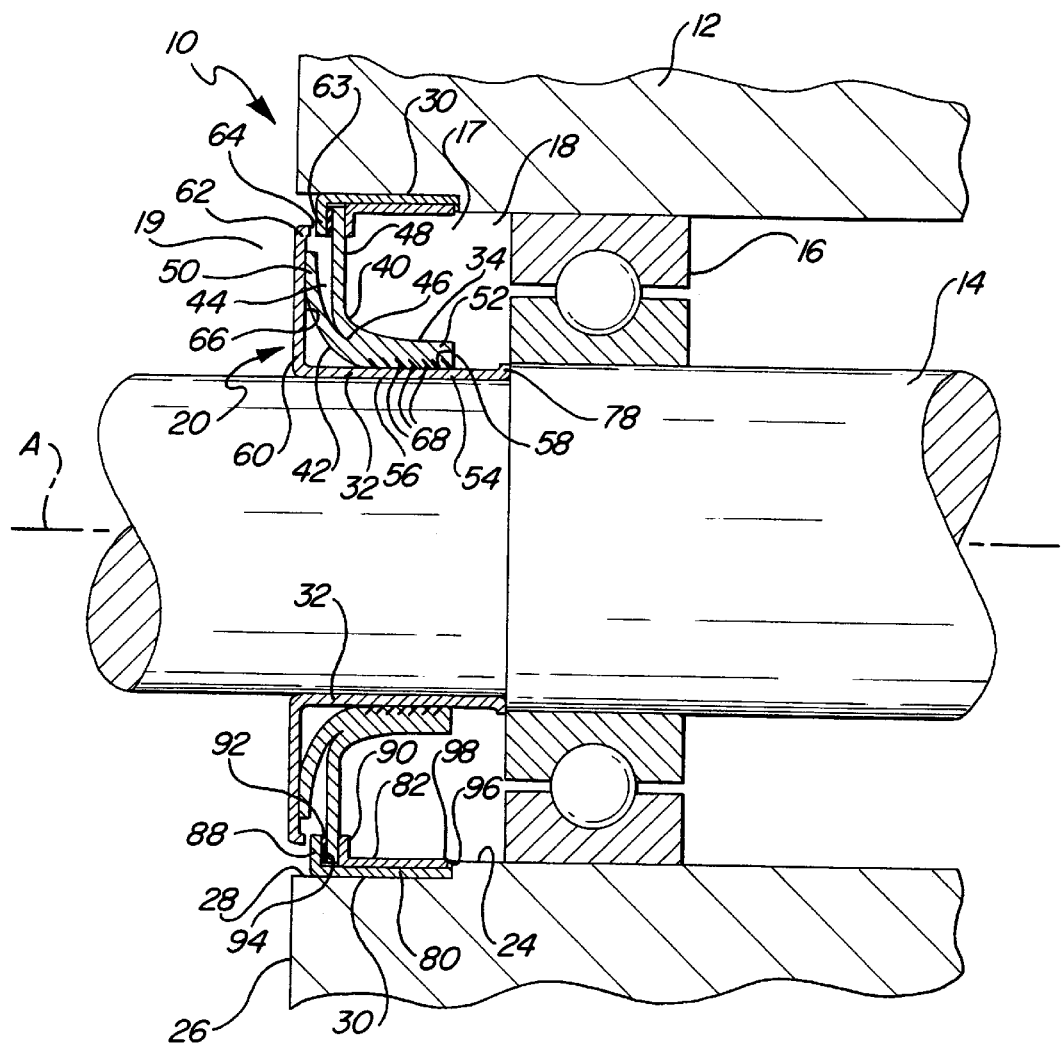
FIG. 1 is a schematic, fragmentary cross-sectional view of a device in which a unitized seal assembly of the invention is installed.
Figure 2:
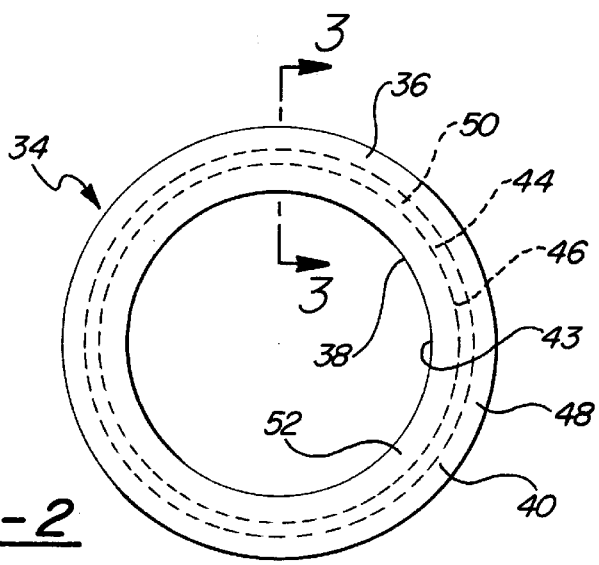
FIG. 2 is an elevational view of a sealing element only constructed according to the invention.

FIG. 1 shows a mechanical device generally at 10 having a stationary component 12 and a rotatable component 14. The rotatable component 14 is journaled by a bearing 16 for rotation about an axis A of the component 14 relative to the stationary component 12. Lubrication, such as oil or grease, is present in an annular clearance gap or space 18 between the components 12, 14 and provides needed lubrication to the bearing 16.

A unitized oil seal assembly 20 constructed according to the invention is disposed within the gap 18 and functions to prevent the lubricant from escaping the gap 18 on a bearing or oil side 17 of the seal assembly 20 facing the bearing 16 and to exclude harmful contaminants such as dust, dirt, and in some cases, harmful liquids or gases on an opposite exterior side 19 of the seal assembly 20 from entering the gap 18 past the seal assembly 20.

It is to be understood that the seal assembly 20 may be used in conjunction with any of a number of devices 10 in which one component 14 rotates relative to another adjacent component 12 and there is a need to seal an annular gap 18 between the components 12,14 to contain a lubricant on one side of the seal and exclude contaminants on the other side. By way of example, the device 10 schematically shown in FIG. 1 may comprise an internal combustion engine wherein the stationary component 12 comprises a stationary case or housing of the engine and the rotatable component 14 comprises a shaft, such as a crank shaft, that extends through an opening 24 in one end 26 of the housing 12. The seal assembly 20 is mounted within an annular recess 28 of the housing 12 and encircles the shaft 14 to effectively close the gap 18.

The seal assembly 20 includes a rigid annular case or carrier member 30, a rigid annular wear sleeve 32, and an annular sealing disk 34 fixed to the carrier member 30 and sealingly engaging the wear sleeve 32. The carrier member 30 and wear sleeve 32 may be fabricated of conventional, structurally rigid materials such as stamped steel components according to conventional practice. The sealing disk 34 comprises a thin, annular wafer fabricated from a single, unitary piece of polymeric material, and preferably a polytetrafluoroethylene (PTFE) based material which may include suitable fillers. The PTFE material is preferably of the type commonly used in seal applications and is not new per se. It will be appreciated that other materials suitable for seal applications, such as elastomers, could also be used.

The sealing disk 34 in its relaxed state has a generally flat ring configuration, including a radially outer edge portion 36, a radially inner edge portion 38, and axially opposite first and second faces 40, 42, respectively. The inner edge portion 38 encircles a central opening 43 of the disk 34 to receive the wear sleeve 32.

The sealing disk 34 is formed with an annular circumferentially extending cut or split 44 that commences at one of the edges and extends radially toward the other edge. In the illustrated embodiment of FIGS. 1–4, the split 44 commences at the outer edge portion 36 of the disk and extends therefrom toward the inner edge portion 38 and terminates at a base or root 46 of the split located intermediate the edges 36, 38. The split 44 divides the outer edge region 36 of the disk 34 into axially adjacent first and second annular split sections 48, 50, that are free at their radially outer ends and are joined to an integral unsplit inner edge section 52 of the sealing disk 34 at a root 46 of the sealing disk 34.

The disk 34 of the first embodiment of FIG. 1–4 has a generally uniform thickness, such that the thickness of the unsplit section 52 is relatively greater than that of the thicknesses of either of the split sections 48, 50. Preferably, one of the split sections 48 has a radial length that is relatively greater than that of the other split section 50 for purposes of mounting the disk 34 to the carrier member 30 in a manner to be described below.

As best shown in FIG. 4, the wear sleeve 32 has a generally cylindrical barrel or body 54 with an inner surface 56 and an outer surface 58. The inner surface 56 is sized for an interference fit on the shaft 14 such that the wear sleeve 14 rotates with the shaft 14 about the axis A. The outer surface 58 is finished to provide a suitable primary or main sealing surface 58 for the wear sleeve 32.

The wear sleeve 32 is formed with an integral annular flange or collar 60 provided on the axially outer end of the wear sleeve 32. The flange 60 extends radially outwardly of the body 54 to a free end portion 62 thereof and preferably beyond a radially inner edge 63 of the carrier member 30. The free end portion 62 is preferably turned axially inwardly toward the carrier member 30 and is spaced axially therefrom by an annular clearance gap 64. An axially inner face 66 of the flange 60 defines a secondary sealing surface 66 of the wear sleeve 32 disposed adjacent to and extending transversely, and preferably perpendicular to, the main sealing surface 58.

According to a characterizing feature of the invention, one of the split sections 48 of the sealing disk 34 is fixed to the carrier member 30 and the other split section 50 and the unsplit section 52 are supported in sealing engagement with the secondary and primary sealing surfaces 66, 58, respectively, of the wear sleeve 32. As shown best in FIG. 4, the unsplit section 52 is bent or curled away from the mounted split section 48 axially inwardly toward the oil side 17 of the seal assembly 20 causing the side 42 of the unsplit section 52 to lay down against the main sealing surface 58 of the wear sleeve 32 to serve as an oil-retaining lip of the seal assembly 20. The unsplit section 52 is formed on its contacting side 42 with a plurality of hydrodynamic formations 68, which may comprise a series of helically disposed flutes, cuts, embossments or other type well known to the art and which are typically provided on the contacting surface of oil-retaining lips to provide hydrodynamic pumping action that assists in retaining the lubricant on the oil side 17 of the seal assembly 20 during operation of the device 10.

As also shown in FIG. 4, bending the unsplit section 52 axially toward the oil side 17 of the seal assembly 20 cups the first face 40 of the sealing disk 34 giving it a generally concave profile. The inward cupping of the first face 40 of the sealing disk 34 exerts an outward convex bowing force on the opposing face 42. Such outward bowing force causes the split 44 to open or separate somewhat, thereby biasing the outer free edge of the other split section 50 away from the mounted split section 48 axially opposite the unsplit section 52 toward the exterior or air side 19 of the seal assembly 20 and into sealing engagement with the secondary sealing surface 66 of the wear sleeve flange 60 to serve as the contaminant-excluding lip seal of the assembly 20.

The split section 50 is likewise curled or bent so as to lay down against the sealing surface 66 and sealingly engage the wear sleeve 32 on the same face side 42 of the disk 34 as that of the unsplit section 52. In other words, mounting the sealing disk 34 by one of its split sections 48 enables the remaining split section 50 and the unsplit section 52 to engage the wear sleeve 32 on a common side or face of the sealing disk (in the illustrated example, the second face 42). This has the advantage of placing the root 46 of the split 44 in compression during service of the seal assembly 20. Any radial or axial movements between the wear sleeve 32 and carrier member 30 would act to further close the split 44, thus isolating the root 46 of the split 44 from tension forces that would tend to tear or prematurely wear the sealing disk at the root 46. It will be appreciated that the split or cut sides 72, 74 of the split sections 48, 50 do not seal against the wear sleeve 32, and are spaced therefrom. As illustrated in FIG. 6, the cut sides 72,74 are disposed in facing contact with one another when the sealing disk 34 in the unstressed free state prior to engagement with the wear sleeve. When installed on the wear sleeve 32, the stress on the disk 34 moves the split sections 48,50 apart, spacing the cut sides The split section 50 has a radial length that is relatively shorter than the radial length of the mounted split section 48. The shorter length enables the split section 50 to deflect outwardly into engagement with the sealing surface 66 while avoiding interference with the carrier 30.

According to a method of making the oil seal assembly 20, the sealing disks 34 are preferably cut from an elongate tubular billet of PTFE. In practice, to make an individual disk 34, the hydrodynamic grooves 68 are first cut into the radially inner edge portion of the end face of the billet. The split 44 is then cut into the outer diameter of the billet and the end face is cut to form the relatively shorter split section 50. The individual disk 34 is then cut from the billet and the process repeated to form additional disks.

The split section 48 of the disk 34 is then fixed to the carrier 30. As illustrated in FIG. 4, the disk 34 is preferably clamped to the carrier 30. For this purpose, the carrier 30 is formed with an outer case portion 80 and an inner case portion 82 each having a cylindrical body 84, 86 and each terminating at their axially outer ends thereof in radially inwardly extending mounting flanges 88, 90. The flange 88 of the outer case portion 82 carries and annular resilient mounting gasket 92 on an axially inward surface thereof opposite the flange 90. The outer free end of the split section 48 is disposed in a gap 94 between the facing surfaces of the mounting gasket 92 and the flange 90 and clamped in place by means of an axial compressive force urging the mounting flange 90 constantly toward engagement with the mounting gasket 92. Such clamping force is applied and then permanently retained by rolling an axially inner end 96 of the case portion 80 about the inner edge 98 of the case portion 82, so as to clamp and retain the split section 48 of the sealing disk 34 securely between the mounting flanges 88, 90.

The wear sleeve 32 is then assembled with the carrier 30 and disk 34 by extending the body 54 of the sleeve 32 axially through the central opening 43 of the disk 34 from the exterior side 19 thereof The unsplit section 52 is engaged by the sleeve 32 and is bent thereby axially inwardly in the direction of insertion as the sleeve 32 is extended through the disk 34 so as to lay down and seal against the primary sealing surface 58 of the sleeve 32. Such bending of the unsplit section 52 forces the unclamped second split section 50 axially outwardly away from the unsplit section 52 toward and into self-biased sealing engagement with the secondary sealing surface 66 of the flange 60 of the wear sleeve 32, as illustrated. It will thus be appreciated that the simple action of extending the sleeve 32 through the sealing disk 34 automatically sets the unsplit oil-retaining lip 52 and the split contaminant-excluding lip 50 of the sealing disk 34 in proper sealing engagement with the sealing surfaces 58, 66 of the wear sleeve 32, without need for an additional step in the process or use of special tools or fixtures.

The wear sleeve 32 is retained against axial inward disconnection from the assembly 20 by confrontation between the flange 60 of the wear sleeve 32 and the flange 88 of the carrier 30. The wear sleeve is further retained against axial outward disconnection from the assembly by means of a radially outwardly extending retaining lip 78 formed on the axially inner end of the wear sleeve 32. Urging the wear sleeve 32 axially outwardly causes the lip 78 to confront the free edge of the unsplit section 52 of the sealing disk 34, thereby limiting the outward axial movement of the wear sleeve 32.

FIG. 5 illustrates an alternative embodiment of the invention, wherein like reference numerals are used to represent corresponding features to the first embodiment, but are offset by 200. The construction of the seal assembly 220 is identical to that of the first embodiment, except the split section 248 is bonded rather than clamped to the carrier member 230. The carrier member 230 has a single outer case portion 280 and lacks the inner case portion 82 of the first embodiment. An elastomeric body 100 is bonded to the carrier 230 and split section 248, thereby securing the sealing disk 234 to the carrier 230. The elastomeric body 100 may comprise rubber or other material compatible with both the metal carrier member 230 and the PTFE sealing disk 234.

FIGS. 6 and 7 illustrate yet a further embodiment of the invention, wherein the same reference numerals are used to represent corresponding features to the first embodiment, but are offset by 300. The sealing disk 334 is formed such that the unsplit section 352 has the same thickness as the split sections 348, 350. The thinner unsplit section 352 is relatively more flexible than that of the relatively thicker unsplit section 52 of the first embodiment and consequently may exert lower contact pressure against the wear sleeve 32. An outer elastomeric member 102 is fabricated of rubber or the like and is bonded to the carrier member 330. The member 102 includes a supplemental contaminant exclusion lip 104 disposed in the gap 364. The lip 104 acts to further exclude dust and other contaminants from entering the seal assembly 320.

FIG. 8 illustrates still a further embodiment of the invention wherein the same reference numerals are used to represent corresponding features to the first embodiment, but are offset by 400. The assembly 420 includes an elastomeric supplemental contaminant exclusion lip 106 bonded to the flange 460 of the wear sleeve 432 and sealingly engaging the flange 488 of the carrier member 430 to close the clearance gap 464. The lip 106 operates in the same manner as the lip 104 of the previous embodiment to exclude contaminants from entering the seal assembly 420.

Obviously, many modifications and variations of the present invention are possible in light of the above teachings. It is, therefore, to be understood that within the scope of the appended claims wherein parenthetical reference numerals are merely for convenience and are not in any way to be limiting, the invention may be practiced as otherwise than as specifically described.

What is claimed is:

1. An oil seal assembly, comprising:

an outer annular carrier member;

a rigid annular wear sleeve having a primary sealing surface and a secondary sealing surface;

at least one sealing disk fabricated of a single wafer of PTFE-based material having, in an unstressed, free state, a generally flat, annular disk configuration having a radially inner edge, a radially outer edge and a pair of laterally opposing face surfaces; and said PTFE sealing disk in its said free state being formed with a circumferential cut commencing adjacent said radially outer edge and extending radially toward said radially inner edge and terminating at a root disposed intermediate said edges, said cut defining laterally adjacent first and second split sections extending from said radially outer edge to said root having laterally inward cut side surfaces disposed in facing contact with one another when said sealing disk is in said free state and an unsplit section extending from said root to said radially inner edge;

said first split section being fixed to said carrier member and said second split section being free;

said sealing disk being axially bent and stressed so that said unsplit section is disposed in longitudinally extending dynamically sealing relation with said primary sealing surface of said wear sleeve, said axial bend of said disk imparting a stress to said second split section urging said second split section laterally away from said first split section such that said cut faces of said split sections are spaced out of contact with one another when said disk is in said stressed condition and said second split section being biased into sealing contact with said secondary sealing surface of said wear sleeve.

2. The assembly of claim 1 wherein said unsplit section and said second split section engage said primary and secondary sealing surfaces of said wear sleeve, respectively, along a common one of said face surfaces of said disk.

3. The assembly of claim 1 wherein said first and second split sections extend from said root in a direction radially outwardly of said primary sealing surface of said wear sleeve.

4. The assembly of claim 1 wherein said unsplit section has a thickness greater than that of each of said split sections.

5. The assembly of claim 1 wherein said PTFE sealing disk is clamped to said carrier between a opposing clamping portions of said carrier.

6. The assembly of claim 1 wherein said root of said split is supported in compression when said sealing disk is stressed.

7. The assembly of claim 1 wherein said sealing disk is formed separately from said carrier in said free state.

8. The assembly of claim 1 wherein said split faces of said first and second split sections are fabricated of said PTFE material extending to said root.

9. The assembly of claim 1 including an auxiliary exclusion lip spaced from said sealing disk and mounted on one of said carrier and said wear sleeve and sealingly engaging the other of said carrier and said wear sleeve to close an annular gap therebetween.

10. The assembly of claim 1 wherein said laterally opposing face surfaces of said PTFE sealing disk are fabricated of said PTFE material.

11. The assembly of claim 1 wherein said unsplit section extends in axial prolongation of said first split section when said disk is in said free state.

12. A method of making an oil seal assembly, comprising:

fabricating an outer annular carrier member;

fabricating an annular wear sleeve having a primary sealing surface and a secondary sealing surface;

fabricating separately from the carrier member a sealing disk made of a single wafer of PTFE-based material having in an unstressed free state a generally flat, annular disk configuration with radially inner and outer edges and a pair of laterally opposing face surfaces;

prior to mounting the sealing disk on the carrier, cutting the disk commencing adjacent the radially outer edge and extending the cut toward the radially inner edge and terminating at a root disposed intermediate the edges, whereby the cut divides a radially outer portion of the disk into a pair of laterally adjacent first and second split sections having cut side surfaces disposed in facing contact with one another when the disk is in the unstressed state and an unsplit section extending from the root of the cut toward the radially inner edge;

fixing the first split section to the carrier; and bringing the wear sleeve into engagement with the sealing disk causing the unsplit section to bend axially away from the first split section bringing the unsplit section into lay-down dynamic sealing engagement with the primary sealing surface of the wear sleeve, and further stressing the disk to deflect the second split section away from the first split section such that their cut surfaces are spaced from one another and the second split is biased into sealing engagement with the secondary sealing surface of the wear sleeve.

13. The method of claim 12 wherein the root of the cut is supported in compression when the sealing disk is mounted in the stressed condition in engagement with the wear sleeve.

14. The method of claim 12 wherein a common one of the face surfaces of the sealing disk engages the primary and secondary sealing surfaces of the wear sleeve.

* * * * *

UNITED STATES PATENT AND TRADEMARK OFFICE
CERTIFICATE OF CORRECTION

PATENT NO. : 6,149,158
DATED : November 21, 2000
INVENTOR(S) : Bhawani S. Tripathy It is certified that error appears in the above-identified patent and that said Letters Patent is hereby corrected as shown below:  ON THE TITLE PAGE Section [57] ABSTRACT, line 2, change "water" to -- wafer --; same line, after "of" (second occurrence) insert -- a --.

Column 5, line 21, after "34" insert -- is --; line 24, after "sides" insert -- 72,74 laterally from one another as shown in Figure 4. --.

Claim 1, line 11, after "in" cancel "its".

Claim 5, line 2, after "between" cancel "a".

Signed and Sealed this

Eighth Day of May, 2001

Attest:

Attesting Officer

NICHOLAS P. GODICI

Acting Director of the United States Patent and Trademark Office